United States Patent
Ladd

(10) Patent No.: US 6,339,727 B1
(45) Date of Patent: Jan. 15, 2002

(54) APPARATUS AND METHOD FOR CONTROLLING DISTRIBUTION OF PRODUCT IN MANUFACTURING PROCESS

(75) Inventor: William P. Ladd, Charlotte, NC (US)

(73) Assignee: Recot, Inc., Pleasanton, CA (US)

( * ) Notice: Subject to any disclaimer, the term of this patent is extended or adjusted under 35 U.S.C. 154(b) by 0 days.

(21) Appl. No.: 09/216,877

(22) Filed: Dec. 21, 1998

(51) Int. Cl.⁷ .............................................. G05B 13/02
(52) U.S. Cl. ......................................... 700/28; 700/117
(58) Field of Search .................. 700/28, 117, 128, 700/129

(56) References Cited

U.S. PATENT DOCUMENTS

| | | | |
|---|---|---|---|
| 4,171,067 A | | 10/1979 | Faulkner et al. ................ 222/1 |
| 4,572,044 A | * | 2/1986 | Antonissen ..................... 83/42 |
| 4,945,794 A | * | 8/1990 | Quo et al. ...................... 83/13 |
| 4,994,295 A | * | 2/1991 | Holm et al. ................. 426/549 |
| 5,262,955 A | * | 11/1993 | Lewis ......................... 700/129 |
| 5,394,790 A | | 3/1995 | Smith .......................... 99/407 |
| 5,560,287 A | | 10/1996 | Petelle et al. .................. 99/451 |
| 5,577,410 A | * | 11/1996 | Willard et al. ................. 73/169 |
| 5,643,626 A | * | 7/1997 | Henson et al. .............. 426/438 |
| 5,771,174 A | * | 6/1998 | Spinner et al. ............. 700/129 |
| 5,781,440 A | * | 7/1998 | Adamy ....................... 700/122 |
| 5,938,961 A | * | 8/1999 | Maher, Jr. ................... 219/497 |
| 5,943,231 A | * | 8/1999 | Thomas ....................... 700/28 |
| 6,092,003 A | * | 7/2000 | Hagart-Alexander et al. .... 700/129 |

FOREIGN PATENT DOCUMENTS

| | | |
|---|---|---|
| EP | 0307076 | 3/1989 |
| EP | 0354116 | 2/1990 |
| WO | 9714384 | 4/1997 |

* cited by examiner

*Primary Examiner*—William Grant
*Assistant Examiner*—Zoila Cabrera
(74) *Attorney, Agent, or Firm*—Rothwell, Figg, Ernst & Manbeck

(57) ABSTRACT

Apparatus and method for controlling the distribution of product items over a manufacturing line, in particular, for controlling the distribution of potato slices across the width of a fryer in a commercial potato chip manufacturing process, includes a number of sensors for measuring the moisture content of potato chips exiting the frying and a controller for determining whether a moisture content variation state exists that should be corrected. A number of rotatable flume distributors are provided which are controlled by the controller in accordance with position adjustment values in a look-up table corresponding to detected moisture content variations. The flume distributors are then adjusted to modify the distribution of potato slices across the fryer to reduce or eliminate the variation in moisture content of the chips leaving the fryer.

14 Claims, 5 Drawing Sheets

|  | 24c RIGHT MM55 HEAD |  | 24b CENTER MM55 HEAD |  | 24a LEFT MM55 HEAD |  |
|---|---|---|---|---|---|---|
|  | MOISTURE COMPARISON ||| FLUME ADJUSTMENT |||
|  | RIGHT | CENTER | LEFT | SLICER 3 | SLICER 2 |  |
|  | L | 0 | 0 | CCW+ | CCW− |  |
|  | H | 0 | 0 | CW+ | CW− |  |
|  | 0 | L | 0 | CW− | CCW− |  |
|  | 0 | H | 0 | CCW− | CW− |  |
|  | 0 | 0 | L | CW− | CW+ | 50 |
|  | 0 | 0 | H | CCW− | CCW+ |  |
|  | L | L | 0 | CCW− | CCW+ |  |
|  | H | L | 0 | CW+ | NC |  |
|  | L | H | 0 | CCW+ | NC |  |
|  | H | H | 0 | CW− | CW+ |  |
|  | L | 0 | L | CCW− | CW− |  |
|  | H | 0 | L | CW+ | CW+ |  |
|  | L | 0 | H | CCW+ | CCW+ |  |
|  | H | 0 | H | CW− | CCW− |  |
|  | 0 | L | L | CW− | CW− |  |
|  | 0 | H | L | NC | CW+ |  |
|  | 0 | L | H | NC | CCW+ |  |
|  | 0 | H | H | CCW− | CCW− |  |
|  | H | L | L | CW+ | CW+ |  |
|  | H | L | H | CW+ | CCW+ |  |
|  | H | H | L | CW+ | CW+ |  |
|  | L | L | H | CCW+ | CCW+ |  |
|  | L | H | L | CCW+ | CW+ |  |
|  | L | H | H | CCW+ | CCW+ |  |
| SLICER 4 |  | SLICER 3 |  | SLICER 2 |  | SLICER 1 |
| 10d |  | 10c |  | 10b |  | 10a |

FIG.5

1=Right+  2=Right−  3=NO CHANGE  4=Left−  5=Left+

| MOISTURE COMPARISON | | | FLUME ADJUSTMENT | |
|---|---|---|---|---|
| RIGHT | CENTER | LEFT | SLICER 3 | SLICER 2 |
| L | 0 | 0 | 1 | 2 |
| H | 0 | 0 | 5 | 4 |
| 0 | L | 0 | 4 | 2 |
| 0 | H | 0 | 2 | 4 |
| 0 | 0 | L | 4 | 5 |
| 0 | 0 | H | 2 | 1 |
| L | L | 0 | 2 | 1 |
| H | L | 0 | 5 | 3 |
| L | H | 0 | 1 | 3 |
| H | H | 0 | 4 | 5 |
| L | 0 | L | 2 | 4 |
| H | 0 | L | 5 | 5 |
| L | 0 | H | 1 | 1 |
| H | 0 | H | 4 | 2 |
| 0 | L | L | 4 | 4 |
| 0 | H | L | 3 | 5 |
| 0 | L | H | 3 | 1 |
| 0 | H | H | 2 | 2 |
| H | L | L | 5 | 5 |
| H | L | H | 5 | 1 |
| H | H | L | 5 | 5 |
| L | L | H | 1 | 1 |
| L | H | L | 1 | 5 |
| L | H | H | 1 | 1 |

FIG. 6

APPARATUS AND METHOD FOR CONTROLLING DISTRIBUTION OF PRODUCT IN MANUFACTURING PROCESS

BACKGROUND OF THE INVENTION

1. Field of the Invention

The present invention generally relates to an apparatus and method for controlling the distribution of product to manufacturing apparatus in a manufacturing process to improve the quality of the finished product. In particular, the invention relates to an apparatus and method for controlling the distribution of food slices, such as potato slices for potato chips, across a fryer in a manner that compensates for variation in the moisture content of slices exiting the fryer by correcting the distribution of slices being fed to the fryer across the width of the fryer to minimize variations in slice moisture content across the fryer.

2. Description of Relevant Art

Commercial production of potato chips typically involves a process wherein potato slices are continuously fed into a vat of hot oil, conveyed through the hot oil by suitable means such as paddles, conveyors and the like, and removed from the oil after an appropriate amount of time when the moisture content of the potato chips has been reduced to about 1.3% –1.4% by weight.

The fryer in such process is typically comprised of an elongated vat or tank for containing frying oil at a temperature of approximately 365° F. Oil supply inlets and oil return outlets are furnished in the tank to provide a circulating supply of hot oil for frying the potato slices. The potato slices are formed by feeding peeled raw potatoes into a number of centrifugal slicer heads, which slice the potatoes into generally uniform slices of appropriate thickness. The slices exiting the slicer heads are then fed to a number of flumes leading the slices to a conveyor belt on which they are passed into the fryer.

The positioning of the flumes typically is directed to achieve a generally even distribution of raw potato slices across the width of the fryer. However, varying conditions in the fryer such as, for example, changes in oil flow, oil temperature, potato slice movement, can cause uneven frying of potato slices, which may result in finished chips having relatively widely varying moisture content. Such variation in moisture content may lead to consumer dissatisfaction with perceived product freshness.

Additionally, during the manufacturing process it is necessary to periodically shut down individual slicers for the purpose of changing slicer heads as a routine maintenance procedure. In the prior art process, this has resulted in an interruption in chip production because of the need to stop the entire line while the slicer head is removed and replaced. This process typically involves halting the feeding of peeled potatoes to the slicers, waiting for the fed slices to clear out of the line, stopping the line, removing and replacing the slicer head(s), starting the feed of peeled potatoes to the slicers, and restarting the production line. The need to periodically change slicer heads presents a shortcoming in the production process that decreases efficiency and restricts product throughput. Consequently, there exists a need for improvement in the art to further improve the consistency of high product quality, and minimize production stoppages caused by the requirement for equipment maintenance.

SUMMARY OF THE INVENTION

The present invention provides an apparatus and method for improving the distribution of product in a manufacturing process so as to increase the consistency of product quality. According to another aspect, the present invention provides an apparatus and method which eliminates the disruption to a production line to carry out routine equipment maintenance.

In particular, the present invention provides apparatus for controlling the distribution profile of product items over a product manufacturing line, comprising means for measuring a physical characteristic parameter of individual product items at a predetermined location in the line, means for comparing a measured characteristic parameter with a predetermined value, and means for changing the distribution profile of product items over the manufacturing line as a function of the result of the comparison.

The present invention further provides, according to a further aspect, apparatus for controlling the distribution of potato slices across the width of a fryer in a commercial potato chip manufacturing line, comprising a plurality of slicer heads, each provided with a supply of potatoes and forming from the potatoes a plurality of substantially uniform potato slices, and discharging the potato slices at respective outlets thereof, a plurality of flumes operatively coupled to the outlets for transporting the slices to a conveyor, each of the flumes terminating in a distributor for placing slices on the conveyor at a specific location, wherein at least one of the distributors is controllably rotatable, a fryer for receiving from the conveyor potato slices to be fried and discharging potato chips produced from the slices at an exit thereof, a plurality of sensors in proximity to the fryer exit for detecting the moisture content of potato chips exiting the fryer as a function of location across the width of the fryer, and developing signals representative of the moisture content, a controller which receives the signals and compares the signals with a predetermined set of values to determine whether variations in moisture content exist among potato chips as a function of location across the width of the fryer, and a look-up table containing position adjustment values for the at least one controllably rotatable distributor as a function of moisture content variation states, the controller retrieving from the look-up table position adjustment values by inputting determined moisture content variation states and controlling the at least one controllably rotatable distributor to rotate to a position such that the distribution of potato slices on the conveyor is changed in a manner to reduce the moisture content variation.

BRIEF DESCRIPTION OF THE DRAWINGS

Other features, benefits and advantages of the present invention will become apparent from the following description of preferred embodiments thereof taken in conjunction with the accompanying drawings wherein:

FIG. 5 is a first example of a Look-Up Table (LUT) containing flume adjustment positions according to moisture variation;

FIG. 6 is a second example of a Look-Up Table (LUT) containing flume adjustment positions according to moisture variation.

DETAILED DESCRIPTION OF THE PREFERRED EMBODIMENTS

Figure 1:
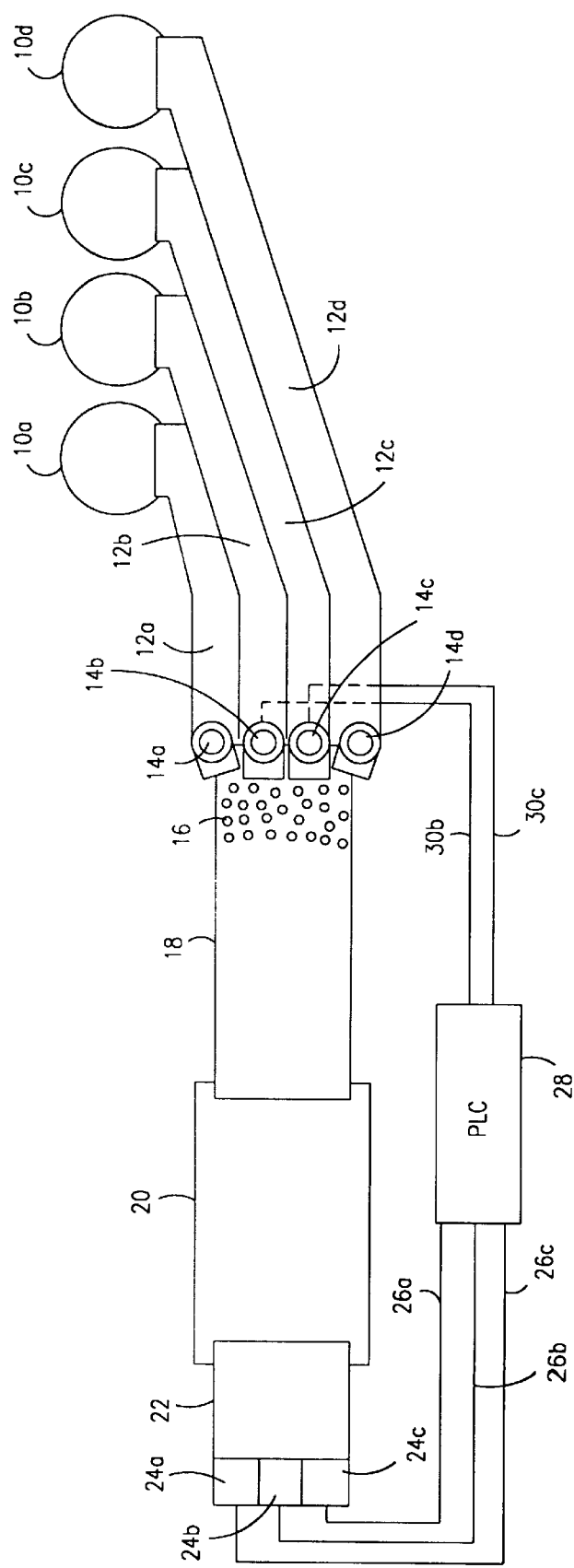
FIG. 1 is a schematic diagram of product manufacturing equipment according to a preferred embodiment of the present invention.

The present invention will be described in relation to apparatus for producing potato chips for purposes of explanation. However, it will be apparent to those skilled in the art that the invention would be applicable to any distributed product manufacturing process in which uniform product characteristics are dependent upon distributed parameters during the manufacturing process.

In a commercial potato chip manufacturing process, a supply of raw peeled potatoes is fed to a plurality of centrifugal slicers 10a–10d, which cut the potatoes into substantially uniformly shaped slices of substantially uniform thickness. Such slicers are well known in the art, see, e.g., U.S. Pat. No. 4,945,794, and therefore a description of their operation will not be provided here.

The raw potato slices 16 are conveyed from the slicers by a plurality of flumes 12a–12d to a washer belt 18, where the raw slices may be washed, before being fed to fryer 20, which contains a circulating supply of hot frying oil. The slices are loaded onto belt 18 by a plurality of flume distributor chutes 14a–14d. The slices are conveyed through the fryer by paddles or a like mechanism (not shown) for a predetermined period of time, after which the resulting chips are removed from the fryer by a conveyor 22, such as an endless belt. The chips are then passed by a plurality of moisture sensor heads 24a–24c, which detect the moisture levels of chips divided by location on the belt into left (24a), center (24b) and right (24c). Such heads also are well known in the art, and are available from Scientific Industrial Development Corporation under the designation MM55. The sensor heads 24a–24c then convert the detected moisture levels into electrical signals and output the signals on signal lines 26a–26c to a Programmable Logic Controller (PLC) 28. Based on the received moisture readings, the PLC 28 will adjust the orientation of rotatable flume chutes 14b and 14c to redistribute raw slices 16 across belt 18 to compensate and correct for variations in moisture levels of chips exiting the fryer according to left, center and right designations. Such variations may be caused by varying conditions such as oil flow through the fryer, oil temperature gradients within the fryer, slice migration, as well as other phenomena.

Figure 2:
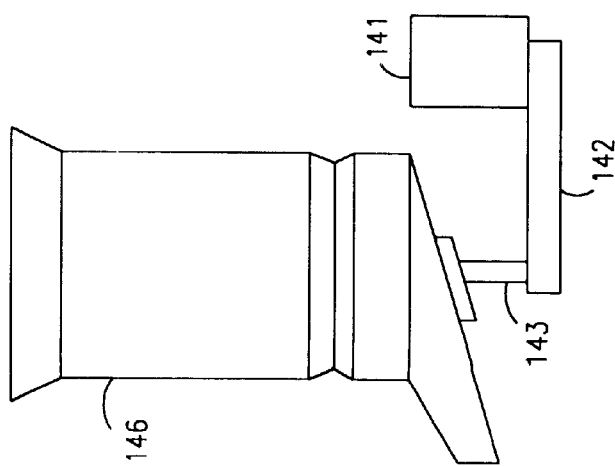
FIG. 2 is an elevational view of a rotatable flume according to a preferred embodiment of the present invention.
Figures 4, 7:
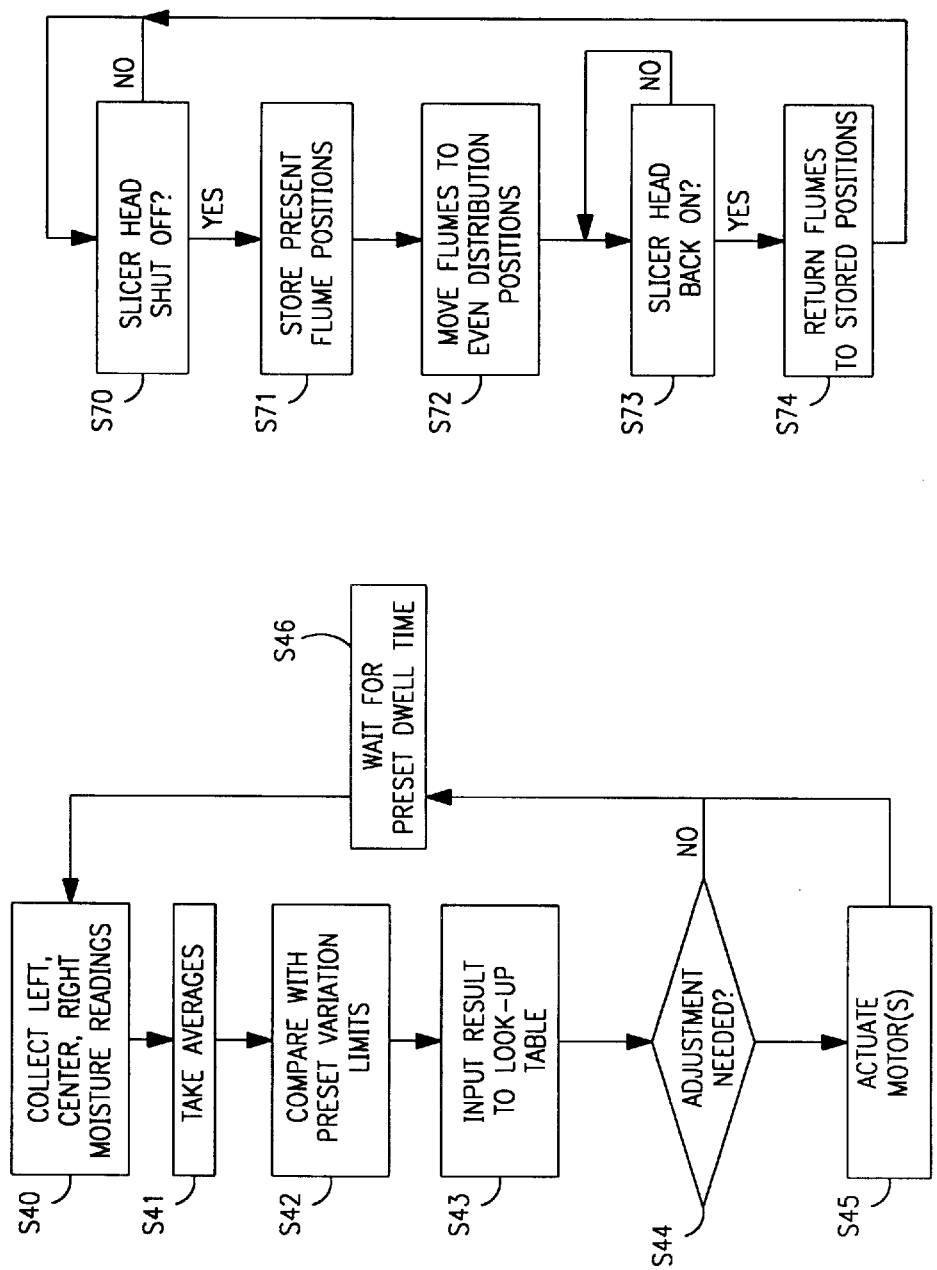
FIG. 4 is a flow diagram of an operation of a controller according to the present invention for adjusting the orientation of the slice flumes.
FIG. 7 is a flow diagram of an operation of a controller according to the present invention for adjusting slice flume orientation during slicer head maintenance shutdown.

According to a preferred mode of operation as illustrated in FIG. 4, the PLC 28 collects the moisture readings at step S40 and averages left, center and right readings over a predetermined period of time at step S41. At step S42, the averaged readings are compared with preset variation limits, to determine whether significant moisture level variations are present. For example, as shown in FIGS. 5 and 6, moisture levels within an acceptable range would be classified as "O" for "on target;" levels above the range would be classified as "H" for "high;" and levels below the range would be classified as "L" for "low." At step S43, the comparison results are inputted to Look-up Tables (LUTs) such as 50 in FIG. 5 or 60 in FIG. 6, to determine whether adjustment of rotatable flume chutes 14b and/or 14c is needed. The adjustments programmed into the LUTs are calculated by experimentation through measurement and observation over a sufficient period of time. It is noted that in the preferred embodiment, outer flume chutes 14a and 14d are stationary, and are oriented so that slices will be positioned just inside the outer edges of belt 18, while inner flume chutes 14b and 14c are rotatable. FIG. 2 is a side elevational view of chute 14b. As shown, a motor 141 drives a pulley or belt 142 which rotates a column 143 attached to the bottom of chute 14b.

Figure 3A:
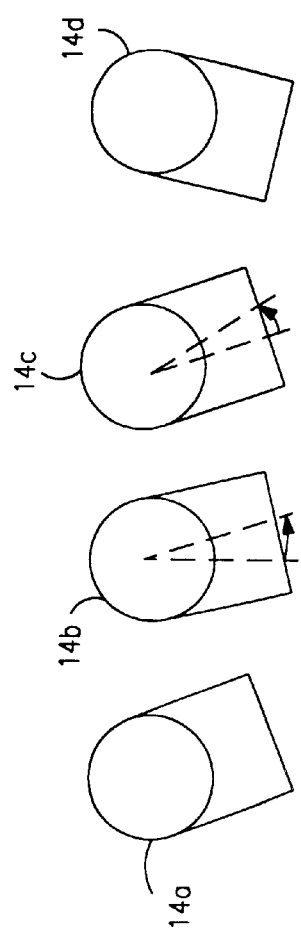
FIGS. 3A and 3B are diagrams illustrating possible orientations of the variable-angle rotatable flumes according to the present invention.

The flume chutes are rotated with the purpose of minimizing moisture level variations of chips exiting the fryer. The possible arc of rotation of the inside chutes is set between a position that places the slices in the middle of belt 18 and a position that places slices just adjacent to the corresponding outside flume chute. Proximity sensors (not shown) detect when a chute is either at its outside limit, or in a zone where collision with the other controlled flume chute is possible. Limit switches (also not shown) are provided within the motor housing to determine when the motors have reached their rotation limit. The range of positions of each controllable chute is calibrated to a range of zero to 100, with 50 denoting the center position, zero denoting a fully counterclockwise (CCW) position, and 100 denoting a fully clockwise (CW) position. Depending on the moisture readings, a chute may be rotated by a large adjustment, a small adjustment, or no change. The degree of rotation corresponding to "large" and "small" may be set appropriately by trial and error. FIGS. 5 and 6 give Ad examples of adjustments based on the calculated moisture level readings. For example, as shown in FIG. 5, where the right side of the fryer has a "low" moisture reading, and the center and left sides are within target level, chute 14c will be moved counterclockwise by a "large" amount, while chute 14b will be moved counterclockwise by a "small" amount. This adjustment has the effect of redistributing the slices across the fryer so that more slices are fed to the right side of the fryer. This is shown in FIG. 3A.

Figure 3B:
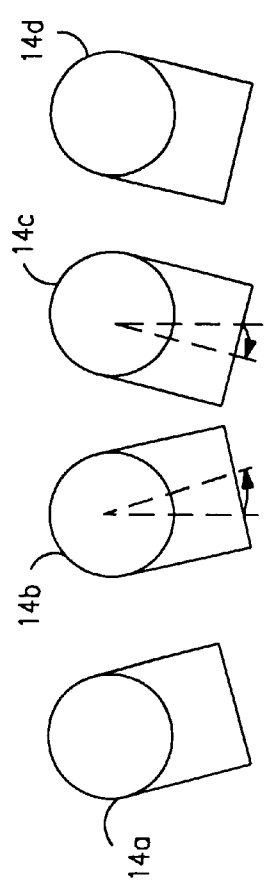

As shown in FIG. 3B, when the readings indicate that the moisture level of chips at the left and right sides of the fryer are high, while the chips at the center of the fryer are within target range, chute 14c will be moved in a clockwise direction by a "small" increment, while chute 14b will be moved in a counterclockwise direction by a "small" increment. This has the effect of reducing the amount of chips fed to the left and right sides of the fryer to bring the moisture levels down to target range.

The necessary adjustments are read from the LUTs by the PLC controller 28, and are converted into actuator signals inputted to the actuator motors 141 through signal lines 30b and 30c.

FIG. 7 explains operation of the PLC when a slicer needs to be shut down, such as for changing of the slicer head. At step S70, the PLC continuously monitors whether a slicer head has been shut off. When a shut off is detected, the present flume positions are stored in a memory at step S71. At step S72, the controllable flume chutes are rotated to positions depending on the slicer head which has been shut off, such that an even distribution of slices across the fryer will be maintained.

The PLC then continuously monitors whether the slicer head has been turned back on at step S73. Once the PLC determines that the slicer has been placed back in service, the stored flume positions are retrieved from memory, and the flumes are restored to their previous positions at step S74.

According to the invention, the system may also include a manual mode wherein the flume positions may be adjusted manually. The system further provides for "home" positions at which the controllable flumes will be oriented at line start-up. The "home" positions are predetermined positions which represent optimal starting points for achieving minimum moisture level variations across the fryer at start-up.

Additionally, flip-up gates are provided at the inlets to the slicer heads, so that raw potato supply may be stopped to a specific slicer when it is necessary to shut down for slicer head replacement.

While the present invention and the embodiments presented herein have been set forth and described in detail for the purposes of making a full and complete disclosure of the subject matter thereof, the disclosure herein presented is not intended to be limiting in any way with respect to the scope of this invention as the same is set forth in the appended claims.

What is claimed is:

1. Apparatus for controlling the distribution profile of product items over a product manufacturing line, comprising:
    means for measuring a physical characteristic parameter of individual product items at a predetermined location in said line;
    means for comparing a measured characteristic parameter with a predetermine value;
    a rotatable distributor that places said product items on said conveyor at an adjustable position on said conveyor, wherein said product items are distributed over the width of a conveyor;
    a controller for changing the distribution profile of product items over said manufacturing line as a function of the result of said comparison, said controller sending a control signal to said rotatable distributor to change said position when the result of said comparison indicates that said measured parameter is not equal to said predetermined value.

2. Apparatus according to claim 1, wherein-said predetermined value is a range and said measured parameter is determined to be not equal to said predetermined value when said measured parameter is outside of said range.

3. Apparatus according to claim 1, wherein said controller comprises a programmable logic controller (PLC).

4. Apparatus according to claim 2, wherein said product item is a potato slice used in manufacturing potato chips, and said physical characteristic parameter is the moisture content of a potato chip formed by said manufacturing line.

5. Apparatus according to claim 4, wherein said predetermined location is at an exit of a fryer through which potato slices pass to be formed into potato chips, said apparatus further including at least one sensor for detecting the moisture content of potato chips exiting said fryer, and transmitting signals representative of said moisture content to said controller.

6. Apparatus according to claim 4, wherein said potato slices are formed from potatoes introduced to at least one slicer device, said slices being conveyed to said distributor by a flume operatively coupled to an outlet of said slicer device.

7. Apparatus according to claim 6, wherein a plurality of slicer devices and associated flumes are provided, and wherein at least one of said plurality of flumes includes a stationary, non-controllable distributor for placing potato slices at a fixed position on said conveyor.

8. Apparatus for controlling the distribution of potato slices across the width of a fryer in a commercial potato chip manufacturing line, comprising:
    a plurality of slicer heads, each provided with a supply of potatoes and forming from said potatoes a plurality of substantially uniform potato slices, and discharging said potato slices at respective outlets thereof;
    a plurality of flumes operatively coupled to said outlets for transporting said slices to a conveyor, each of said flumes terminating in a distributor for placing slices on said conveyor at a specific location, wherein at least one of said distributors is controllably rotatable;
    a fryer for receiving from said conveyor potato slices to be fried and discharging potato chips produced from said slices at an exit thereof;
    a plurality of sensors in proximity to said fryer exit for detecting the moisture content of potato chips exiting said fryer as a function of location across the width of said fryer, and developing signals representative of said moisture content;
    a controller which receives said signals and compares said signals with a predetermined set of values to determine whether variations in moisture content exist among potato chips as a function of location across the width of said fryer; and
    a look-up table containing position adjustment values for said at least one controllably rotatable distributor as a function of moisture content variation states;
    said controller retrieving from said look-up table position adjustment values by inputting determined moisture content variation states and controlling said at least one controllably rotatable distributor to rotate to a position such that the distribution of potato slices on said conveyor is changed in a manner to reduce said moisture content variation.

9. A method for controlling the distribution profile of product items over a product manufacturing line, comprising the steps of:
    measuring a physical characteristic parameter of individual product items at a predetermined location in said line;
    comparing a measured characteristic parameter with a predetermined value;
    changing the distribution profile of product items over said manufacturing line as a function of the result of said comparison, wherein said product items are distributed over the width of a conveyor, said manufacturing line including a rotatable distributor that places said product items on said conveyor at an adjustable position on said conveyor;
    sending a control signal to said rotatable distributor to change said position when the result of said comparison indicates that said measured parameter is not equal to said predetermined value.

10. A method according to claim 9, wherein said predetermined value is a range and said measured parameter is determined to be not equal to aid predetermined value when said measured parameter is outside of said range.

11. A method according to claim 10, wherein said product item is a potato slice used in manufacturing potato chips, and said physical characteristic parameter is the moisture content of a potato chip formed by said manufacturing line.

12. A method according to claim 11, wherein said predetermined location is at an exit of a fryer through which potato slices pass to be formed into potato chips, said manufacturing line further including at least one sensor for detecting the moisture content of potato chips exiting said fryer, and transmitting signals representative of said moisture content to a controller.

13. A method according to claim 12, wherein said potato slices are formed from potatoes introduced to at least one slicer device, said slices being conveyed to said distributor by a flume operatively coupled to an outlet of said slicer device.

14. A method according to claim 13, wherein a plurality,y of slicer devices and associated flumes are provided, and wherein at least one of said plurality of flumes includes a stationary, non-controllable distributor for placing potato slices at a fixed position on said conveyor.

* * * * *